(12) United States Patent
Hanada et al.

(10) Patent No.: US 6,717,774 B2
(45) Date of Patent: Apr. 6, 2004

(54) INFORMATION RECORDING AND REPRODUCING APPARATUS WITH AN AIR FORCE LATCH MECHANISM

(75) Inventors: Kazuyoshi Hanada, Hadano (JP); Masao Iwakura, Odawara (JP); Yasuyuki Hozumi, Kannami (JP); Kazumi Fujimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/956,061

(22) Filed: Sep. 20, 2001

(65) Prior Publication Data

US 2002/0075603 A1 Jun. 20, 2002

(30) Foreign Application Priority Data

Dec. 19, 2000 (JP) .......................................... 2000-389957

(51) Int. Cl.[7] ................................................. G11B 5/54
(52) U.S. Cl. ................................. 360/256.1; 360/256.2
(58) Field of Search .......................... 360/256.1, 256.2, 360/97.01, 97.02

(56) References Cited

U.S. PATENT DOCUMENTS

| | | | | |
|---|---|---|---|---|
| 4,538,193 A | | 8/1985 | Dimmick et al. ........ | 360/256.1 |
| 4,647,997 A | * | 3/1987 | Westwood ................ | 360/256.1 |
| 4,692,829 A | | 9/1987 | Campbell ................. | 360/256.1 |
| 5,319,511 A | | 6/1994 | Lin ........................... | 360/256.1 |
| 5,668,683 A | * | 9/1997 | Stone ....................... | 360/256.1 |
| 5,717,544 A | * | 2/1998 | Michael ................... | 360/256.1 |
| 5,793,572 A | * | 8/1998 | Lalouette et al. ........ | 360/256.1 |
| 6,337,782 B1 | * | 1/2002 | Guerin et al. ............ | 360/256.1 |
| 6,339,521 B1 | * | 1/2002 | Durrum et al. .......... | 360/256.1 |
| 6,430,007 B1 | * | 8/2002 | Jabbari ..................... | 360/256.1 |
| 6,462,912 B1 | * | 10/2002 | Pasupathy et al. ....... | 360/256.1 |

FOREIGN PATENT DOCUMENTS

| | | | |
|---|---|---|---|
| JP | 2000-251424 A | * | 9/2000 |
| JP | 2002-109843 A | * | 4/2002 |

* cited by examiner

Primary Examiner—Jefferson Evans
(74) Attorney, Agent, or Firm—Mattingly, Stanger & Malur, P.C.

(57) ABSTRACT

In a latch mechanism that holds an actuator with a high shock resistance two or more magnetic members are arranged in a latch component, which generates a weaker attraction force but a more easy rotation of the latch component. The structure concentrates a magnetic force in order to rotate the latch component effectively. The effect of the magnetic force in a direction perpendicular to the direction of rotation of the magnetic members becomes smaller and a friction force at the rotation center of the latch is reduced.

5 Claims, 6 Drawing Sheets

INFORMATION RECORDING AND REPRODUCING APPARATUS WITH AN AIR FORCE LATCH MECHANISM

BACKGROUND OF THE INVENTION

1. Field of the Invention

The present invention relates to an information recording and reproducing apparatus, and more particularly, in an apparatus in which media for recording information rotate, to a latch mechanism that is capable of holding and releasing a mechanism that is inside this apparatus.

2. Description of the Related Art

Mechanisms that employ wind power, which is generated by the rotation of media for recording information, for the holding and releasing of a head for reading and writing information on these media, are disclosed, for example, in U.S. Pat. Nos. 5,319,511, 4,538,193, and 4,692,829, and so forth. However, while a member for taking up wind that is on given media is disposed in the inventions of these publications, no consideration is given to the use of shock-resistant surfaces in an information recording apparatus.

The latch mechanisms of U.S. Pat. No. 5,319,511, and so forth, have a fin that is disposed so as to extend to the top of such media and at the gap between one medium and another medium. Wind, which is produced when the media rotate upon startup of the apparatus, is received by this fin, thus causing rotation of the latch mechanism, whereby a carriage of the apparatus is released from a restrained state. When the apparatus is stopped, magnetic members, which are provided on a latch of the latch mechanism, are attracted by magnetic flux leaking from a voice coil motor (hereinbelow, termed VCM where appropriate). When the apparatus is started up, the latch mechanism is caused to rotate in the reverse direction, whereby the carriage is restrained. The rotational center of the latch mechanism is constituted by mating a hole-shaped rotational center, which is in a latch molded from a resin, with a pin that is press-fit into a base, and by pushing this rotational center onto this pin.

Here, when the latch mechanism is in a position at which the carriage is released from a restrained state, if the attraction force causing action by the magnetic members of the latch with respect to a VCM magnet is not strong enough to counter the friction force at the rotational center of the latch mechanism, the latch is unable to rotate to return to an original position thereof at which the carriage was restrained.

According to these known examples, magnetic members are disposed in one location. With magnetic members in one location, in order to maintain an attraction force that exceeds the friction force at the rotational center of the latch when the latch is in a position that is farthest from the magnet, a strong attraction force is concentrated on magnetic members in one location. Consequently, the combined force resulting from the attraction force within the range of rotation of the latch, and the friction force, is not constant, and hence the difference between a minimum value and maximum value for this resultant force is considerable.

SUMMARY OF THE INVENTION

In such a latch mechanism, it is ideal for magnetic members, which are provided on a latch, to receive a magnetic force (attraction force) from the VCM only in the direction of rotation of the latch, this being the drive direction. Here, efficiency is extremely good. However, the present inventors have discovered that, since, in actuality, a magnetic force also acts in a direction perpendicular to the rotation of the latch, a problem exists of considerable friction at the rotational center of the latch.

In addition, in order to obtain a wind power that counters the force from the VCM that acts on the magnetic members, particularly in an apparatus that has one medium or two media and is relatively small, in order to maintain an attraction force, however small, wind power must be received by a fin being disposed so as to extend to the top of the medium/media. Further, with regard to the positioning of the fin such media are covered by same, it is unfavorable for there to be a risk of the media and the fin colliding with one another, or of the surface of the media being damaged, when the apparatus is subjected to shocks from the outside.

By means of this constitution, when the attraction force is strong, there is a requirement for the wind power to also be strong, and the present inventors have discovered that there is a problem of wear to the components at the rotational center, resulting from same being caused to rotate in a strong dynamically balanced relationship, and of the life of these components being short. The present inventors have discovered that, on account of the fact that the cross-sectional shape of the latch mechanism must be made large due to the requirement for the components to be strong enough to endure a strong dynamically balanced relationship, a problem arises of high material costs. The present inventors have also discovered that, as a result of making the cross-section of the latch broad, the latch as a whole becomes heavy, and the imbalance of the latch is such that the ability of the apparatus to withstand shocks is reduced (there is a tendency for the latch to move as a result of these shocks). Also, as a consequence of obtaining a strong wind power with respect to a strong attraction force, a fin, which extends to the top of the media, induces turbulence in the flow of air on the surface of the media, whereby the stability of the head against upward floatation thereof is adversely affected. A further problem has been discovered in that, as a result of the problem of vibrations of the magnetic recording media, which are caused by this turbulent flow, it is not possible to make such media thin.

In addition, when the latch mechanism is being disposed in the apparatus, since the criterion for positioning the latch components is to place same on a base, and also because the magnetic members are disposed at one location, the present inventors have found that a problem arises in that there is a potential for a considerable positional error between the magnetic members and magnet, and in that the timing for movement of the latch is irregular. In the prior art, there has been a requirement for strict precision for components between the magnet and magnetic members. It has, however, been discovered that this requirement cannot be reconciled with a demand for miniaturization of the apparatus or for a constitution thereof with high component density.

Furthermore, from the viewpoint of shock resistance, the disposition of any member whatever on the media for recording information, for example of a head supported by an actuator, is by no means favorable. Consequently, when an actuator is held under the action of a latch mechanism, the present inventors have considered the fact that a head, which is supported by an actuator, or any components accompanying this head, must not be present on the media for recording information.

Further, US Patent publications such as U.S. Pat. No. 4,538,193, disclose a mechanism that performs release of the carriage by releasing a latch, by causing same to rotate, under the action of wind power in the space between the surface of a medium, which is closest to the base, and the base; and that restrains the carriage by causing the latch to rotate in the opposite direction by means of a spring. In U.S. Pat. No. 4,692,892, release of the carriage is performed in the same manner, but the carriage is restrained by means of a mechanism that causes the latch and base to rotate in opposite directions to one another as result of repelling action by a magnet provided on the latch and base, respectively. The same problems are posed by these patent publications and by U.S. Pat. No. 5,319,511.

In an apparatus of the prior art, a magnetic member is disposed in one location. With the magnetic member in one location, therefore, in order to attempt to maintain an attraction force that exceeds the friction force at the rotational center of the latch when the latch is in a position that is farthest from the magnet, a large force is concentrated on the magnetic member that is in one location. Consequently, the disparity between the minimum value and maximum value of the attraction force of the magnet is considerable within the range within which the latch rotates, and this has produced a variety of problems.

By disposing magnetic members in a plurality of disperse locations, in the latch mechanism, it becomes possible to attenuate the fluctuations in the attraction force generated by the magnet. Magnetic force that does not contribute to the movement of the latch mechanism should be also reduced. The latch mechanism is constituted such that the fin, which serves to take up the wind power, is not shifted over the recording surfaces of the information recording media, and such that the fin is not placed on the surfaces of the recording media.

More specifically, magnetic members are disposed in two separate locations, these two separate magnetic members being arranged in the vicinity of the VCM magnet such that the combined force resulting from the magnetic force, which is within the range of rotation of the latch and is caused by the magnetic flux leaking from the VCM, and from the friction force of the latch, becomes even.

Further, "latch mechanism" is intended to refer to a mechanism that comprises, as components, a latch, and peripheral components or parts of the apparatus that are employed in conjunction with this latch.

DESCRIPTION OF THE PREFERRED EMBODIMENTS

Figure 1:
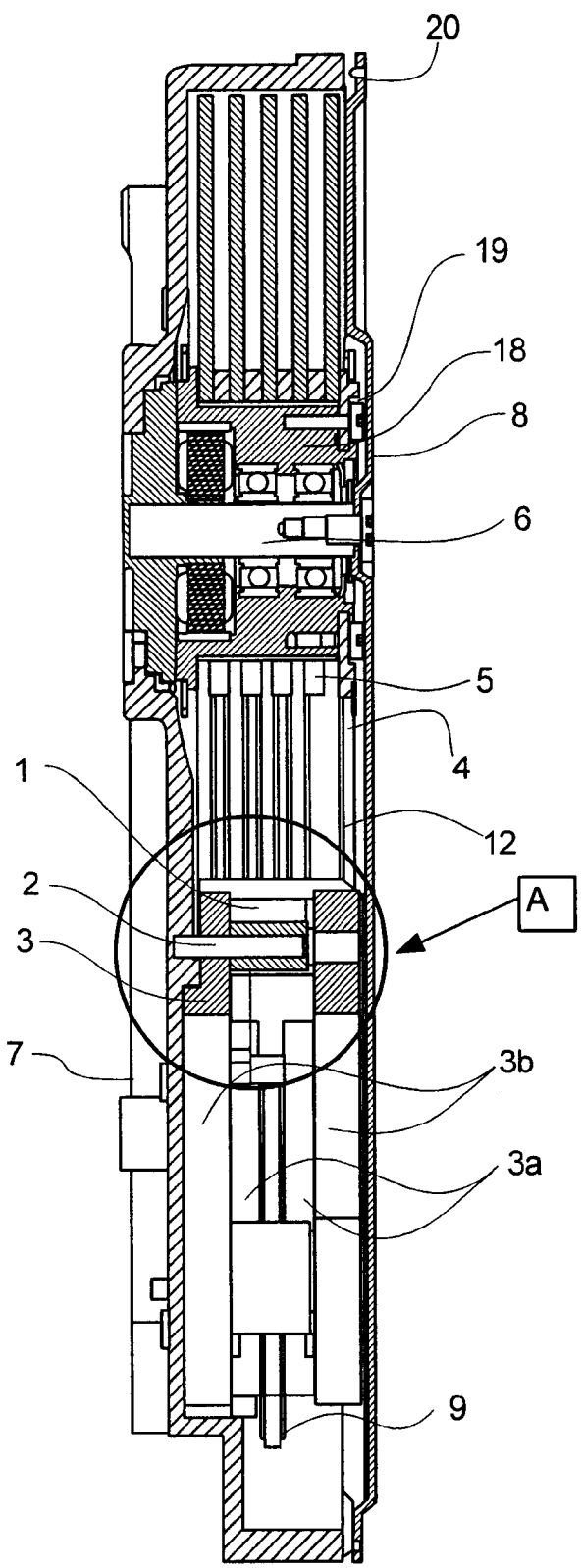
FIG. 1 is a side cross-sectional view of a magnetic disk apparatus that is an application example of the present invention.

The general constitution of an information recording and reproducing apparatus, to which the present invention may be applied, for example, a magnetic disk apparatus, is described hereinbelow.

Magnetic disk media 4 (FIG. 1), whose substrate material is aluminum or glass, have a magnetic film formed on the surface thereof, and are thus capable of holding information magnetically. A spindle motor 6 has a hub 18 that serves to rotate magnetic disk media 4, same being stacked on this hub, and a disk clamp 19 that serves to fix media 4 to hub 18, and the spindle motor 6 is supported, such that hub 18 is rotatable, via a bearing on a motor shaft, same being provided on a base 7. During actuation of the magnetic disk apparatus, and with magnetic disk media 4 rotating, a magnetic head 11 (FIG. 2) floats up and travels (flies) over predetermined tracks provided on media 4, whilst maintaining a gap with respect to the surface of media 4 of only a few nanometers (nm).

Magnetic head 11 comprises an electromagnetic coil for writing information to media 4 magnetically, or for reading information from media 4, which converts electrical signals and magnetic fields; and an MR element that reproduces electrical signals from magnetic fields. This electromagnetic coil and this MR element are shaped by means of a thin metal film multiple layer-shaping technique, as one part of a head slider, for example as a side face thereof, that has a predetermined shape and whose principal component is ferrite or ceramic.

Carriage 12 supports magnetic head 11 on an arm whose raw material is aluminum or magnesium, and since carriage 12 is rotatably driven by voice coil motor 3, magnetic head 11 is precisely positioned on the surface of magnetic disk media 4. Carriage 12 is rotatably supported, via a bearing on a carriage shaft that is provided on base 7, in the same manner as spindle motor 6. Voice coil motor 3 comprises a coil 9, which constitutes a winding of an aluminum or copper wire material that has an insulating covering film; permanent magnets 3a; and yokes 3b, which support permanent magnets 3a and thus form a magnetic circuit therewith. The external form of coil 9 is molded and held by a resin, and molded integrally with carriage 12. Carriage 12 and voice coil motor 3 comprise a head drive mechanism.

Further, since shock resistance is raised when the magnetic disk apparatus is not performing movements to record or reproduce information, carriage 12 does not cause magnetic head 11 to be placed on media 4. That is, a mating portion, which is provided on the tip of magnetic head 11, is suspended on a ramp 10 provided at the outer edge of media 4 and thus causes magnetic head 11 to be retracted away from media 4 (unloaded state). When the magnetic disk apparatus is performing recording or reproduction of information, magnetic head 11, which has been thus retracted, is shifted along the ramp 10 to media 4 by a drive force that is applied by carriage 12, and floats up and flies over media 4, a predetermined gap being maintained therefrom (loaded state).

Figure 2:
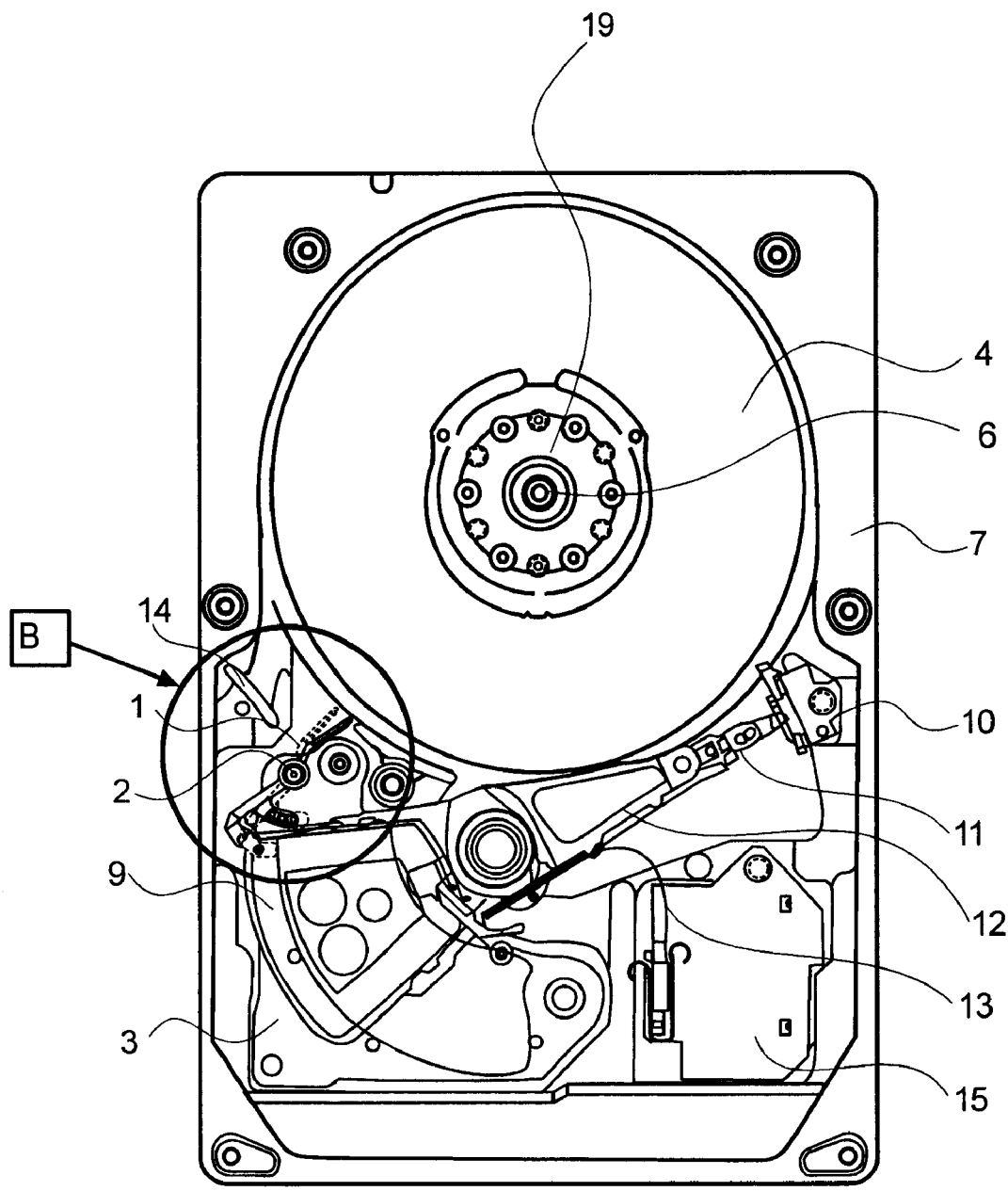
FIG. 2 is a top view of the magnetic disk apparatus that is an application example of the present invention.

Signals during the recording or reproduction of information by magnetic head 11 are guided over carriage 12 by thin wires provided on magnetic head 11, and then transmitted to an FPC13 (flexible print circuit, FIG. 2). These signals are then transmitted out of the HDA via a read/write control substrate 15, by means of an encapsulated-type connector that is positioned on the underside of read/write control substrate 15. "HDA" is intended to refer to mechanism components within the magnetic disk apparatus, in addition to media 4, magnetic head 11, and spindle motor 6, and to parts that house, in an airtight fashion, an electronic circuit accompanying these components.

The encapsulated-type connector is constituted by a raw material that is aluminum, stainless steel or iron, and is provided on base 7 through adhesion thereto, and serves to relay electrical signals to and from the HDA.

The encapsulated-type connector has a plurality of pins, for transmitting signals, and molded parts for holding these pins, encapsulated therein. The drive current of coil 9 is also transmitted to the encapsulated-type connector through FPC 13. The drive current of spindle motor 6 is also guided from spindle motor 6 and transmitted to the encapsulated-type connector by means of the motor FPC.

Signal wires from the encapsulated-type connector are provided outside the HDA and communicate with a main substrate whereon an electronic circuit is mounted for controlling the magnetic disk apparatus. Spindle motor 6, the axis of carriage 12, and voice coil motor 3 are fixed to base 7 using a screw, and a cover 8 (FIG. 1) whose raw material is aluminum, stainless steel or iron is fixed, using a screw, to base 7 via a packing 20 in order to maintain a seal with base 7, to spindle motor 6, to the axis of carriage 12 and to voice coil motor 3.

Since the HDA performs movements for the writing and reading out of information between magnetic head 11 and magnetic disk media 4, and because it is necessary to keep the gap between magnetic head 11 and magnetic disk media 4 of this magnetic head, and the spaces in the HDA continually clean such that no foreign matter is suspended therein, an internal circulation filter 14 (FIG. 2) is provided so that internal dirt and dust is trapped by an air circulation system inside the HDA that is produced by the rotation of magnetic disk media 4.

In a high-capacity magnetic disk apparatus that has a plurality of magnetic disk media 4 mounted therein to achieve a given storage capacity, a magnetic head 11 is present for the surface of each one of these media 4. A disk spacer 5 (FIG. 1) is provided between each of these magnetic disk media 4 for this purpose such that each of the magnetic heads 11 is supported with a uniform gap from each of the media being maintained as a result of faces of carriage 12, whereon magnetic heads 11 are to be mounted, being finished with a good level of precision.

A detailed description of the embodiment of the present invention will be provided hereinbelow by means of FIGS. 1 to 7.

The apparatus comprises a latch 1 for maintaining a fixed position for carriage 12 such that same does not rotate when the magnetic disk apparatus is not performing movements to record or reproduce information, also during storage thereof. This latch is intended to serve to prevent damage to information being recorded while carriage 12 rotates and is shifted over magnetic disk media 4 when the apparatus is subjected to shocks in the direction of rotation of these media.

Figure 6:
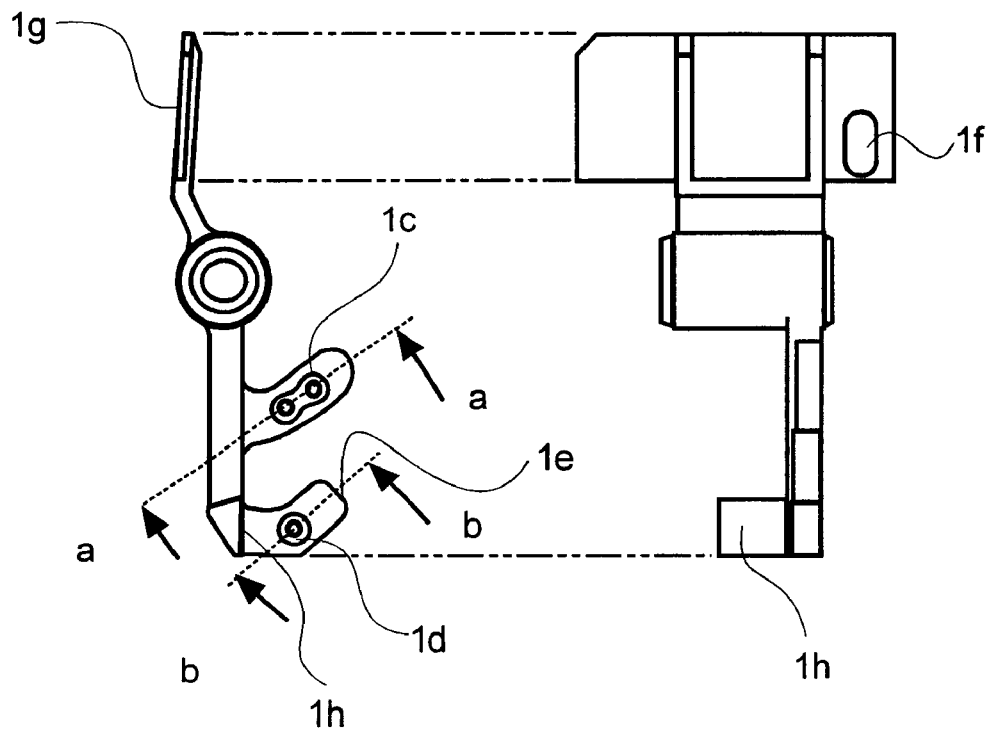
FIG. 6 is a figure showing a side face and top face of the latch components employed in part B of FIG. 2.
Figure 7:
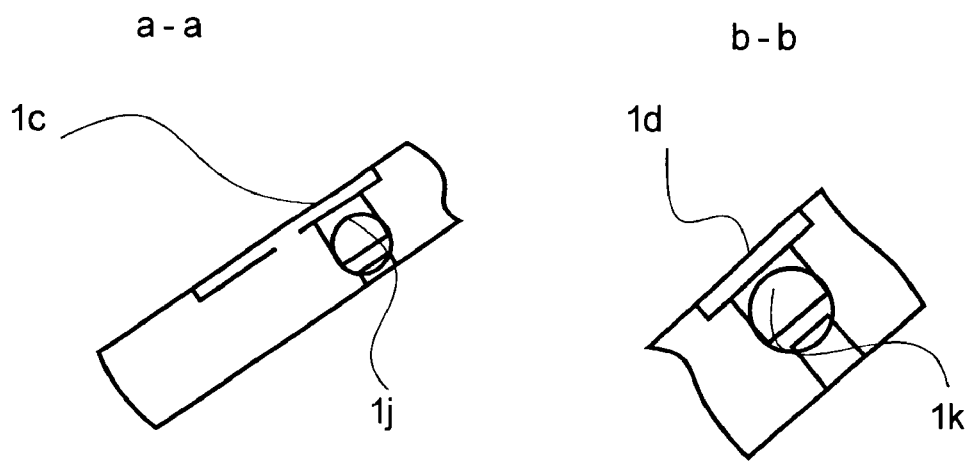
FIG. 7 is a cross-sectional view taken along lines a—a and b—b.

The shape of latch 1 according to the present embodiment is shown in FIG. 6. Latch 1 comprises a fin 1g for receiving wind produced in the vicinity of the respective end faces of media 4 when media 4 start to rotate and during rotation thereof; a cylindrical rotational center hole that mates with a shaft about which the latch rotates; and two magnetic members, namely a first magnetic member 1j and a second magnetic member 1k (FIG. 7). Hereinbelow, the first magnetic member is referred to as magnetic member A and the second magnetic member is referred to as magnetic member B. When the rotation of media 4 is stopped, in order for magnetic members A and B to cause latch 1 to rotate in a direction that is opposite to the direction when the rotation of media 4 is started, these members are attracted by magnets 3a (FIG. 1). The material of these magnetic members is SUS440, and in the present embodiment, commercially available bearing balls are employed.

Except for magnetic members A and B, latch 1 is integrally molded from a resin. Magnetic member 1j and magnetic member 1k are inserted in a first hole 1c and second hole 1d (termed hereinbelow, wherever appropriate, "hole A" and "hole B", respectively), whereupon these members are fixed therein by melting resin in the vicinity of the insertion opening of each hole. Hole A (1c) and hole B (1d) are formed with a specified interval of 5 mm therebetween. This 5-mm interval may be modified within a range conforming to the shape of magnets 3a and such that no interference results with any other peripheral members of magnets 3a, and may be adjusted in accordance with wind power received by the fin. Here, "interference" is intended to refer to a state in which further movement by these members with respect to one another is prevented through collision of these members with one another.

Figure 3:
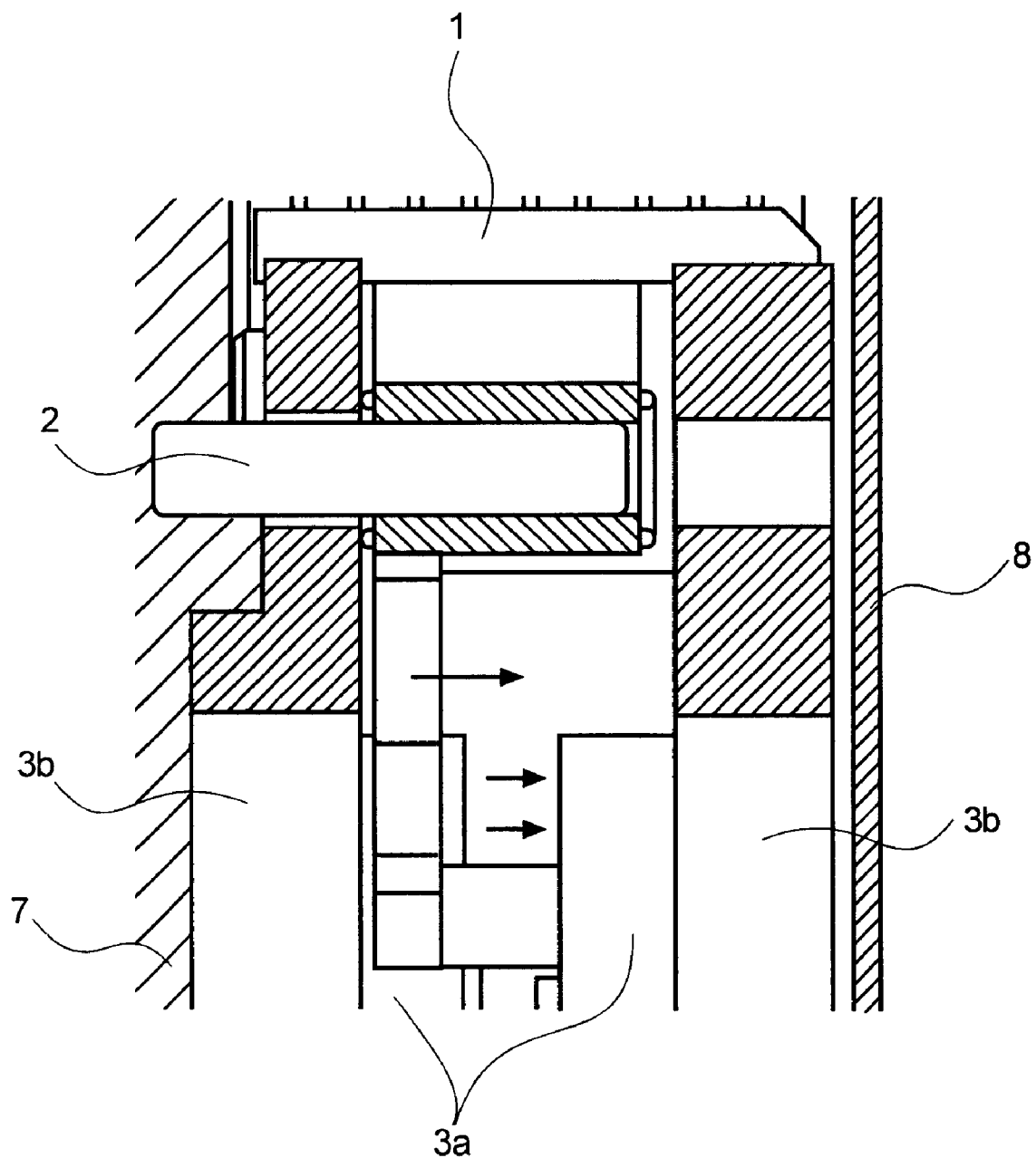
FIG. 3 is an enlarged view of part A of FIG. 1.
Figure 4:
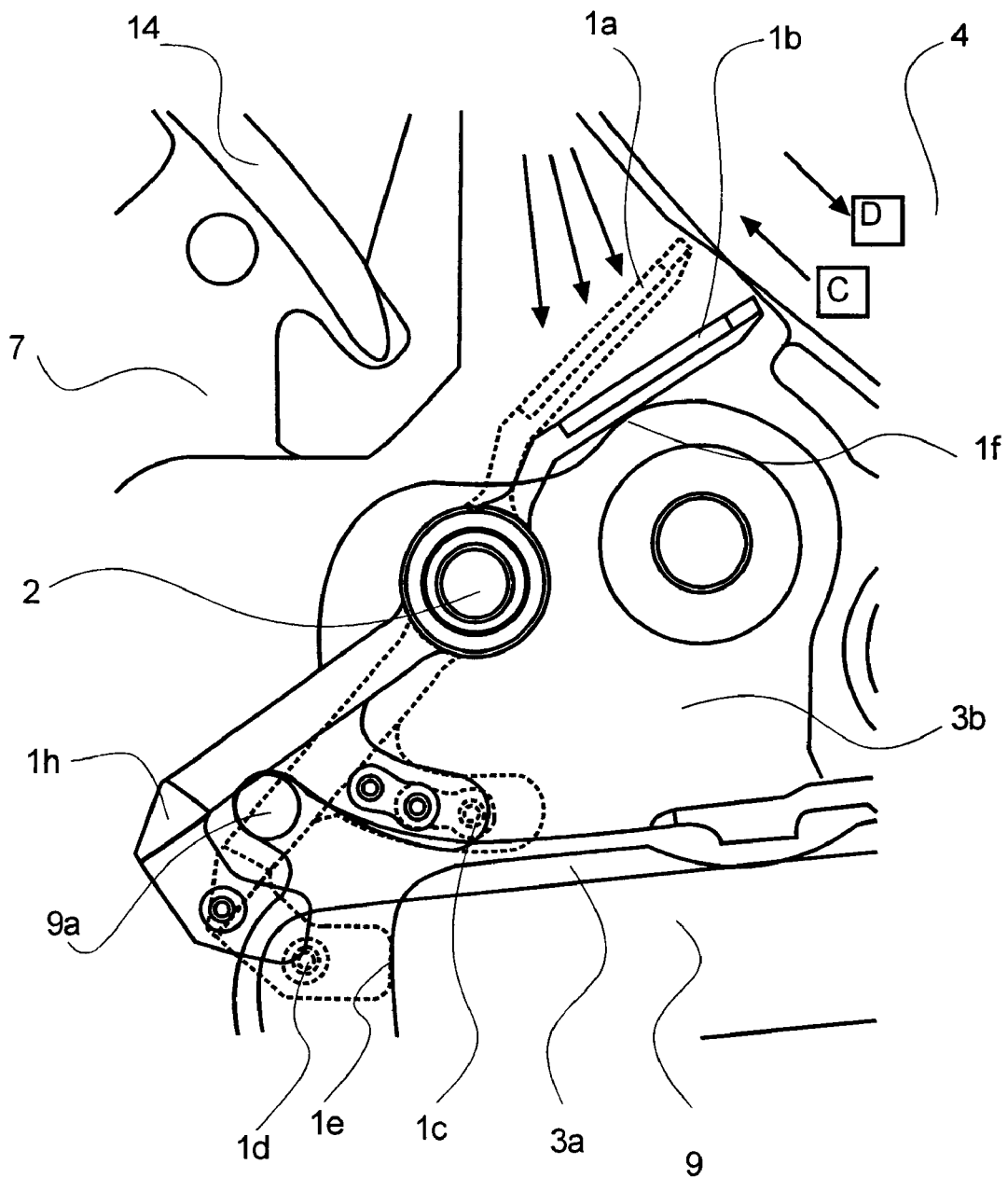
FIG. 4 is an enlarged view of part B of FIG. 2.

Latch 1 is mounted in such a manner that latch 1 rotates by virtue of a stainless steel pin 2, that is press-fit into base 7, is inserted into latch 1. As shown in FIG. 3, which is an enlarged view of part A of FIG. 1, the direction of insertion of pin 2 is confined to a position between the two yokes 3b of VCM 3. As shown in FIG. 4, which is an enlarged view of part B of FIG. 2, when the latch is in latch position 1a shown by a dotted line, and the two magnetic members 1j and 1k (FIG. 7) are attracted by magnets 3a, a close contact portion 1e comes into contact with an arc-shaped part at the outer perimeter of magnets 3a. Further, latch 1b, as shown by the solid line in FIG. 4, represents a state in which the rotational range of this latch is restrained as a result of wind power, which exceeds the combined force resulting from the attraction force of magnets 3a and friction force at the rotational center of the latch, causing an open contact portion 1f of latch 1 to come into contact with lower yoke 3b.

The function of latch 1 will be described hereinbelow. When latch 1a is in the state shown by the dotted line of FIG. 4, even if the main face of the magnetic disk apparatus is subjected to shocks in the direction of rotation of media 4, since a latch hook portion 1h of latch 1 is caught on a coil hook portion 9a which is provided on a part molded from resin that holds coil 9, carriage 12 is unable to rotate. Further, "the main face" of the magnetic disk apparatus is intended to refer to a side face that is parallel to magnetic disk media 4. Since the center of gravity of latch 1 is matched to rotational center 2 of latch 1, even if the magnetic disk apparatus is subjected to shocks in the direction of rotation of media 4, latch 1 does not rotate. Here, it is sufficient to specify a value of 1 mm or less for the deviation of rotational center 2 from the center of gravity of latch 1 (displacement of the center of gravity) in the manufacture of latch 1. Further, in order to minimize the effect of the deviation from the center of gravity, latch 1 is made lightweight, the overall mass thereof may be 0.5 g or of another value specified for the manufacture thereof.

Under these conditions, by making the attraction force of magnet 3 as large as possible, the ability of latch 1 to resist shocks is in turn improved. The maximum of such an attraction force is established by means of a condition that the attraction force should be smaller than the rotational moment induced by the combined force resulting from wind power generated when rotation of media 4 starts and from the friction force at rotational center 2. In other words, in order to obtain an attraction force of large magnitude, wind power of large magnitude is required. In order to maintain a good level of efficiency of wind power generated through rotation of media 4, wind power is picked up with a good level of efficiency at a distance of 1 mm or less from the end face of magnetic disk media 4. In the present embodiment, a value for this minimum gap is established in the manufacture of the apparatus that is no more than 0.5 mm.

Furthermore, the height of fin 1g is greater than the combined height of stacked magnetic disk media 4, and this fin 1g is not disposed on media 4. A gap is maintained between coil hook portion 9a and latch hook portion 1h such that, when latch 1 is caused to rotate by wind power, rotational movement by these portions is not prevented by friction therebetween. When magnetic disk media 4 rotate, fin 1g receives wind at the end face of media 4, and when the moment which is induced by the combined force resulting from the wind power and the friction force at rotational center portion 2 exceeds the moment which is induced by the force under whose action the two magnetic members 1j and 1k (FIG. 7) are attracted toward magnets 3a, latch 1 starts to rotate from latch position 1a of FIG. 4 in the direction of arrow D, and, at latch position 1b, as shown by a solid line in FIG. 4, latch 1 stops rotating as a result of open contact portion if of latch 1 coming into contact with lower yoke 3b. Thereupon, latch hook portion 1h releases carriage 12 from a restrained state as a result of rotation by latch 1. Further, latch 1, which is molded from a resin, is subjected to treatment to make the surface thereof electrically conductive in order to prevent electrostatic thereon. Static electricity, which is produced as a result of wind being received by fin 1g, is released to the ground from base 7 via pin 2.

In addition, rotation of media 4, which affords the above-mentioned critical wind power, may be provided in the course of a switchover from a state, in which media 4 have been stopped, to a certain rotation speed. For example, rotation may be provided in the course of a transition from a state in which low-speed rotation is in progress, in standby mode or a power-save mode, to a state in which the rotation speed is increased or decreased to a predetermined rotation speed. A predetermined rotation is possible for a case in which movement is performed to increase the rotation speed after media 4 have been temporarily held at a predetermined rotation speed when a load or unload movement is being executed.

Figure 5:
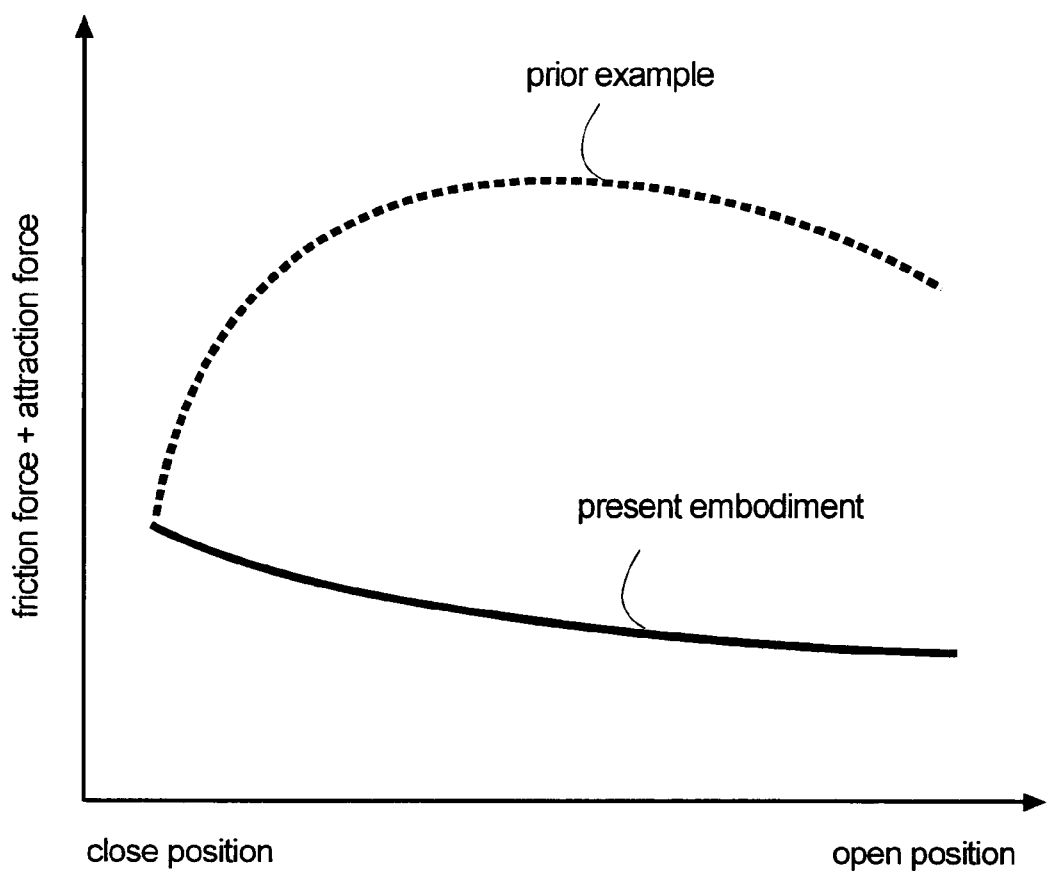
FIG. 5 is a graph showing the attraction torque in the magnetic disk apparatus that is an application example of the present invention.

FIG. 5 is a graph with values plotted that represent the sum of the attraction force, within the range of rotation of the latch, and the friction force, with magnetic members being disposed according to a prior example and according to the present embodiment. In a comparison of these two latches, the rotation speed of magnetic disk media 4 was set to be the same. By disposing a magnetic member or magnetic members, which is disposed in one location in the prior example, in two disperse locations such that an attraction force is received by these magnetic members that is weaker than that of the prior example, it was possible to reduce the adverse effect of the magnetic force, irrespective of movement by latch 1. In other words, the effect on the magnetic members, which causes these magnetic members to be attracted in a direction perpendicular to the rotation of the latch, was minimized. As shown in FIG. 5, a marked reduction of the sum of the attraction force, and the friction force at the rotational center 2, of latch 1, was achieved.

By virtue of a characteristic for the sum of the attraction force and friction force being obtained with the present embodiment that is even, compared with the characteristic of the prior example (FIG. 5), regular timing for movement by latch 1 was also achieved. A certain disparity (deviation) may occur in the positions of the magnetic members and magnets 3a depending on the precision of the components of latch 1 or precision of the assembly of these components. This results in the production of a deviation also in the timing of movement by latch 1 when rotation of media 4 starts. A deviation that was one quarter of the deviation of the prior example was achieved with the present embodiment.

Compared with the prior art, the latch mechanism is capable of movement even with weak wind power, and by causing a drop in the speed of rotation of the media, it was possible to achieve a low consumption of electrical power by the information recording and reproducing apparatus.

The special features of the present embodiment may be presented as follows:
1) In a state in which the apparatus is stopped and the latch restrains the carriage, magnetic members are disposed in two locations, namely in the vicinity of an end face of the perimeter of the VCM magnet, and in the vicinity of a side face thereof that connects inside perimeter end faces of the VCM magnet.
2) The magnetic members are disposed in two locations so as to engage the action of the attraction force toward the VCM, the interval between these magnetic members being established to be of the order of 5 mm.
3) An angular position is established for the latch, when the apparatus has stopped or is operating, such that the latch abuts the end face of the VCM magnet or the end face of the lower yoke.
4) The center of gravity of latch 1 is established in a position at least of the order of 1 mm in a radial direction from the rotational center thereof, and the weight of latch 1 is of the order of 0.5 g.
5) The face, of the fin portion of the latch, that is adjacent to the end faces of the media, is established in a position at which the interval of the gap from the media end faces is of the order of 0.5 mm, this being a minimum value.
6) A width is established for the fin that is greater than the combined height of the stacked media.
7) The latch is constituted by an electrically conductive member, or the surface of the latch is subjected to a treatment to make same electrically conductive.
8) During normal operation, a gap is provided between the carriage and the latch such that the latch does not come into contact with the carriage.

The above-described constitution results in it being possible to make the attraction force, which is induced by the magnetic force required for movement of the latch, small, and to make the force, which acts within the range of movement by the latch, uniform.

Furthermore, by establishing a position for latch 1 with magnets 3a of the voice coil motor, and with yokes 3b, since the positional error between the magnetic members and magnets 3a can be made small, irregularity in the timing of movement by latch 1 can be minimized, and the requirement for precision of components between magnets 3a and the magnetic members may be relaxed, whereby a reduction in component costs is made possible.

A latch mechanism employing wind power is thus achieved that reconciles demands for miniaturization of the magnetic disk media and of the magnetic disk apparatus, for a reduction in the costs of the apparatus, and for a constitution with a high density of components inside the apparatus.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. An information recording and reproducing apparatus, comprising:

rotatably supported information recording media;

a head for recording information on said information recording media and for reproducing information from said information recording media;

a head drive mechanism that causes said head to be shifted to a predetermined position on said information recording media, the head drive mechanism employing a current that flows in a coil provided near a magnet and a drive force that is induced by the reciprocal action of magnetic fields; and a latch mechanism that holds said head drive mechanism at a predetermined position, and that releases said head drive mechanism from said predetermined position, the latch mechanism having:

a fin that receives the air flow generated by rotation by the information recording media without covering the surfaces of the information recording media;

a plurality of magnetic members that are attracted by the magnetic fields of said head drive mechanism;

a pin that is provided such that the latch mechanism is rotatable by the force received by said plurality of magnetic members and the force received by said fin; and a hook portion that is provided so as to interfere with movement of said head drive mechanism;

wherein as a result of said fin receiving the air flow generated by predetermined rotation of said information recording media, said hook portion is released form a state of interference with movement of said head drive mechanism, and movement of said head drive mechanism is possible.

2. The information recording and reproducing apparatus according to claim 1, wherein when said latch mechanism holds said head drive mechanism, said head is not present on said information recording media.

3. The information recording and reproducing apparatus according to claim 1, wherein said magnetic fields are generated by said magnet, and, when said latch mechanism holds said head drive mechanism, said plurality of magnetic members are disposed separately to face to each side of a corner portion of said magnet.

4. The information recording and reproducing apparatus according to claim 1, wherein the width of said fin in the direction of the axis of rotation thereof is greater than the combined height of said stacked information recording media.

5. The information recording and reproducing apparatus according to claim 1, wherein said latch is electrically conductive so as to release static electricity to ground via said pin.

* * * * *